United States Patent

Atkins et al.

Patent Number: 6,109,065
Date of Patent: Aug. 29, 2000

[54] METHOD OF MAKING OPTICAL WAVEGUIDE DEVICES USING PERCHLORYL FLUORIDE TO MAKE SOOT

[75] Inventors: Robert Michael Atkins, Millington; Robert Scott Windeler, Clinton, both of N.J.

[73] Assignee: Lucent Technologies, Inc., Murray Hill, N.J.

[21] Appl. No.: 09/065,961

[22] Filed: Apr. 24, 1998

Related U.S. Application Data

[63] Continuation-in-part of application No. 09/063,900, Apr. 22, 1998, abandoned.

[51] Int. Cl.$^7$ ............................................. C03B 37/027
[52] U.S. Cl. ............................. 65/399; 65/417; 65/420
[58] Field of Search .......................... 65/399, 417, 420

[56] References Cited

U.S. PATENT DOCUMENTS

| | | | |
|---|---|---|---|
| 3,117,838 | 1/1964 | Sterling | 423/335 |
| 4,002,512 | 1/1977 | Lim . | |
| 4,217,027 | 8/1980 | MacChesney | 65/417 |
| 4,402,720 | 9/1983 | Edahiro et al. . | |
| 4,583,997 | 4/1986 | Staudigl | 65/426 |
| 4,810,673 | 3/1989 | Freeman | 427/255.393 |
| 5,058,976 | 10/1991 | Di Giovanni et al. . | |
| 5,059,230 | 10/1991 | Mollenauer | 65/418 |
| 5,711,782 | 1/1998 | Okamura | 65/399 |

FOREIGN PATENT DOCUMENTS 2306955   7/1995   United Kingdom .

OTHER PUBLICATIONS

Townsend et al., "Solution–Doping Technique for Fabrication of Rare–Earth–Doped Optical Fibres", Electronic Letters, vol. 23, No. 7, Mar. 26, 1987, pp. 329–331.

Ainslie, B.J., "A Review of the Fabrication and Properties of Erbium–Doped Fibers for Optical Amplifiers", Journal of Lightwave Technology, vol. 9, No. 2, Feb. 1, 1991, pp. 220–227.

Atkins, R.M. et al., "Reactions of silicon tetrachloride and germanium tetrachloride with oxygen and oxides of nitrogen", *J. Mater. Res.*, vol. 4, No. 3, May/Jun. 1989 pp. 641–650.

*Primary Examiner*—John Hoffmann

[57] ABSTRACT

Applicants have determined that much of the nonuniformity in solution doped preforms is due to nonuniformity of the soot layer caused by the high temperature necessary for complete reaction, and that MCVD fabrication using reaction temperature lowering gases such as nitrous oxide ($N_2O$) can produce more uniform soot layers. The conventional oxygen/reactant gas mixture presents a very small temperature window in which a uniform silica soot layer can be deposited without sintering. If the temperature in oxygen is too low, $SiCl_4$ will not react completely and silicon oxychlorides will form. This degrades the soot layer and makes it unusable. If the temperature is too high the soot layer begins to sinter, decreasing the surface area and porosity. Adding a reaction temperature lowering gas lowers the reaction temperature and enables deposition of soot on the tube wall at a temperature substantially lower than the sintering temperature. This results in a more uniform, porous soot layer along the length of the preform and from one preform to another; and, in turn, the greater uniformity permits more uniform solution doping.

9 Claims, 1 Drawing Sheet

METHOD OF MAKING OPTICAL WAVEGUIDE DEVICES USING PERCHLORYL FLUORIDE TO MAKE SOOT

CROSS REFERENCES TO RELATED APPLICATIONS

This application is a continuation-in-part of the U.S. patent application Ser. No. 09/063,900 entitled Improved Method For Making Optical Waveguide Devices and Preforms Therefor and filed by the present applicants on Apr. 22, 1998 now abandoned.

FIELD OF INVENTION

This invention relates to methods for making optical waveguide devices using the MCVD process and, in particular, to an improved method especially useful for solution doping.

Optical waveguide devices are typically made of optical fiber drawn from a preform. The preform is typically a cylindrical body having a diameter much greater than the diameter of the fiber, but having a scaled radial distribution of composition that is the same as the fiber to be drawn from it. Typically the preform has compositionally distinct regions corresponding to the cladding and the core. To produce regions of differing optical properties, dopants are incorporated into the glass.

Optical fiber preforms are commonly made by the modified chemical vapor deposition process (MCVD process) described, for example, in the Kirk-Othmer *Encyclopedia of Chemical Technology*, Vol. 10, pp. 514–537 (4th Ed. 1994), which is incorporated herein by reference. In the MCVD process, a metal chloride reagent gas such as $SiCl_4$ or $GeCl_4$, along with oxygen is introduced into the interior of a rotating glass tube. The tube is heated with an external torch to effect a homogeneous reaction of the reagent gas with oxygen inside the tube and thereby produce silica particles (soot) that deposit thermophoretically on the inner wall of the tube in a thin, porous layer. The cladding material is deposited first and then the core material. Dopants such as germanium, phosphorous and boron are typically introduced with the reagent gas as gaseous halides. After the deposition steps are completed, the tube is collapsed to make the preform.

Certain dopants important for key optical devices such as lasers and amplifiers do not have suitable gaseous or volatile halides. For example there are no gaseous compounds of rare earth elements such as erbium, ytterbium, praseodymium or neodymium which are suitable for the MCVD process. Such dopants are typically introduced using the solution doping process described in J. E. Townsend et al., "Solution Doping Technique For Fabrication of Rare Earth-Doped Fibers", *Electronic Letters*, Vol. 23, Vol. 7, No. 7 (1987), which is incorporated herein by reference.

Solution doping typically involves soaking the soot layer with a solution containing the desired doping elements and draining the treated soot to leave a residue of the doping elements. The soot layer is then sintered to incorporate the doping elements in the resulting glass.

Modification of the conventional MCVD process for solution doping presents particular difficulties. Initial sintering is not desirable, and variations in porosity or degree of sintering along the tube produce unwanted variations in the concentration and uniformity of the solution residue which, in turn, produce variations in dopant concentration from preform to preform and along the length of fibers drawn from a preform. Accordingly, there is a need for an improved method of making MCVD preforms to be used in solution doping.

SUMMARY OF THE INVENTION

Applicants have determined that much of the nonuniformity in solution doped preforms is due to nonuniformity of the soot layer caused by the high temperature necessary for complete reaction, and that MCVD fabrication using reaction temperature lowering gases such as nitrous oxide ($N_2O$) can produce more uniform soot layers. The conventional oxygen/reactant gas mixture presents a very small temperature window in which a uniform silica soot layer can be deposited without sintering. If the temperature in oxygen is too low, $SiCl_4$ will not react completely and silicon oxychlorides will form. This degrades the soot layer and makes it unusable. If the temperature is too high the soot layer begins to sinter, decreasing the surface area and porosity. Adding a reaction temperature lowering gas lowers the reaction temperature and enables deposition of soot on the tube wall at a temperature substantially lower than the sintering temperature. This results in a more uniform, porous soot layer along the length of the preform and from one preform to another; and, in turn, the greater uniformity permits more uniform solution doping.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
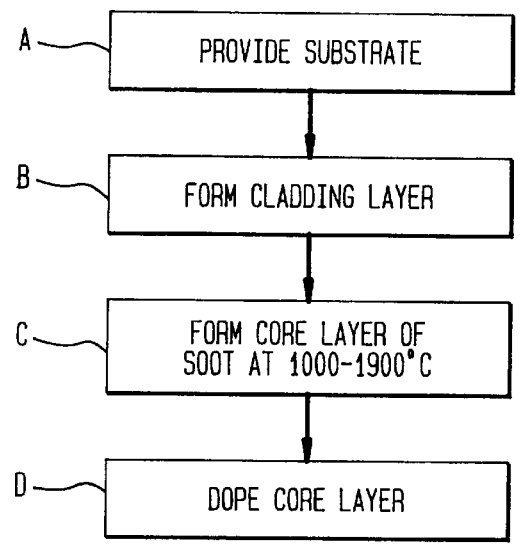
FIG. 1 is a flow diagram of an improved process for making optical waveguide devices.
Figure 2:
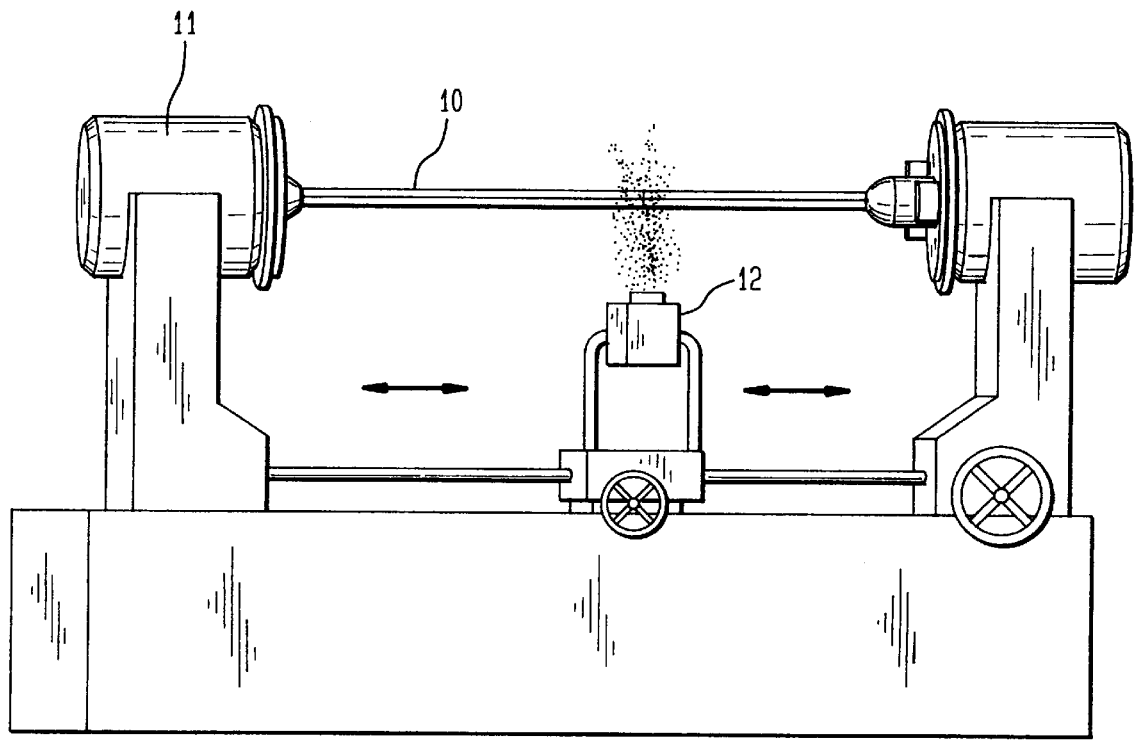
FIG. 2 is a schematic view of apparatus useful in practicing the method of FIG. 1.

Referring to the drawings, FIG. 1 is a schematic flow diagram of an improved process for making optical waveguide devices. An initial step, shown in block A, is to provide a substrate. In general, the substrate can be any refractory material compatible with glass films. It can be glass, ceramic or semiconductor. In the preferred application for making optical fiber waveguide devices, the substrate can be a hollow tube of glass. For example, as shown in FIG. 2, a fused silica tube 10 (typically ID≧6 mm, wall thickness≦6 mm) can be set up on a standard glass blowers lathe 11.

The next step, shown in block B, is to form a cladding layer of silica soot on the substrate. This is typically accomplished using the conventional high temperature MCVD process by flowing a precursor gas mixture into the interior of the tube and heating the tube wall. Preferably the tube is rotated during this process. The initial layer is cladding glass conventionally formed from a mixture of $SiCl_4$ and oxygen. The cladding glass can be doped with one or more of the following species: phosphorous (precursor: $POCl_3$), germanium ($GeCl_4$), fluorine ($C_2F_6$), boron ($BCl_3$) and aluminum ($AlCl_3$). The cladding layer can be deposited by standard MCVD using an oxygen-hydrogen torch (12 of FIG. 2) which traverses at 40 to 200 mm/min and heats the tube wall between 1750 and 2350° C. Alternatively, a reciprocating plasma torch could be used. Oxygen for oxidizing the precursors is added in greater than stoichiometric amount, and helium (50 to 2000 cc/min) is added to assist in sintering.

The third step (block C) is to form a core layer of silica soot. In accordance with the invention, the core layer is put down at a lower temperature to prevent the soot attached to the tube wall from sintering as the torch passes over it. Germanium or phosphorous dopant species, among others, can be included in the $SiCl_4$ for making the core soot.

Oxygen (stoichiometric amount or more) is added to oxidize the metal chlorides and helium can be added to promote heat transfer. An additional reaction temperature lowering gas, preferably $N_2O$, is added to lower the temperature at which the $SiCl_4$ reacts to form silica soot. In general, a reaction temperature lowering gas is an oxidizing agent (containing oxygen) which is stable and non-reactive when mixed with the MCVD precursor gases at temperatures below 50° C., but which reacts readily with $SiCl_4$ (and/or other MCVD precursor gases) at temperatures below 1500° C. or which decomposes to yield oxygen on heating to a temperature below 1500° C. It may be preferred to dilute the reaction temperature lowering gas with oxygen and/or helium in order to avoid the possibility of highly exothermic reaction (explosion) occurring. For example, perchloryl fluoride $ClO_3F$ can be used as an alternative reaction temperature lowering gas provided it is diluted with sufficient oxygen and helium to avoid explosive reaction.

The core soot is deposited with a torch traverse rate typically at 40 to 200 mm/min, and the maximum tube temperature is maintained in the range 1000–1900° C. and preferably in the range 1200–1900° C. It should be noted that additional core layers not to be solution-doped can be formed before or after doping using the conventional high temperature MCVD process.

The next step shown in block D is to expose the unsintered soot layer to a desired dopant. The exposure can be by solution doping or by exposure to a dopant gas. There are several ways to solution dope. The most common method is to separate the preform tube from the tailstock tube and to remove the preform from the lathe. The preform is held in a vertical position and slowly filled from the bottom with an alcohol/water solution containing the desired dopant conveniently in the form of salts. Typical salts are aluminum chloride and rare earth chlorides ($ErCl_3$, $YbCl_3$, $PrCl_3$, and $NdCl_3$). However, any metal, e.g. cobalt, can be incorporated into the glass by this method. The only limit to the salt concentration is its solubility in the solution. The solution is held in the tube for typically between 5 min. and 1 hour, then drained slowly out of the tube. The tube is put back on the lathe and dried. The soot is then sintered with a torch traverse of 40 to 200 mm/min and tube temperature ranging from 1750 to 2350° C. Additional solution doped layers can be deposited to produce a larger core or to radially vary the concentration of species in the core. The preform is then collapsed.

Doping by exposure to a dopant gas involves passing a gas containing a desired dopant species over the soot layer as the layer is being sintered. This can be used to produce layers containing higher concentrations of certain dopants, such as fluorine or phosphorous, than can be obtained by conventional MCVD doping process. The preform is subsequently collapsed.

The invention can now be better understood by reference to the following specific examples.

EXAMPLE 1

Three pure silica cladding layers are deposited in a 17 by 10 silica tube by flowing 1.5 g/min $SiCl_4$ in 850 cc/min $O_2$ and 400 cc/min He. An oxygen-hydrogen torch traverses the tube, heating the tube to a temperature of 2050° C. The silicon tetrachloride oxidizes into silica particles which deposit on the tube wall by thermophoresis and sinter to form a thin glass layer as the torch passes. The core soot layer is deposited next. The temperature is lowered on this pass to prevent the soot from sintering on the tube wall. The gas conditions in the tube are 0.6 g/min $SiCl_4$, 200 cc/min $O_2$, and 500 cc/min $N_2O$. The torch heats the tube to 1650° C. A uniform soot layer is formed which is strong enough for solution doping. The tube is separated at the tailstock end and hung vertical. The preform tube is slowly filled with a solution of $4 \times 10^{-3}$ M $ErCl_3$ and 0.3 M $AlCl_3$ in water. The solution soaks for 20 min and then is slowly drained. The preform tube is put back on the lathe and allowed to dry by flowing 1 L/min $O_2$ for 1 hour through the tube. The soot is then sintered using the torch with a tube temperature of 1900° C. Finally the tube is collapsed into a preform rod.

EXAMPLE 2

A preform structure with an unsintered core layer is formed as described in Example 1. Instead of solution doping, however, the unsintered core layer is exposed to a gas containing fluorine species ($SiF_4$) by passing $SiF_4$ gas through the interior of the tube while applying a torch to the exterior of the tube to sinter the core layer. The torch traverse rate is 50 mm/min, to produce a sintering temperature of 2050° C.

EXAMPLE 3

A preform structure with an unsintered core layer is formed as described in Example 1. Instead of solution doping, the unsintered core layer is exposed to a gas containing phosphorous species ($POCl_3$ along with a stoichiometric amount of $O_2$) by passing the gas mixture through the interior of the tube while sintering the core layer at the torch traverse rate and temperature described in Example 2.

It is to be understood that the above-described embodiments are illustrative of only a few of the many possible specific embodiments which can represent applications of the principles of the invention. Numerous and varied other methods and arrangements can be made by those skilled in the art without departing from the spirit and scope of the invention.

What is claimed:

1. A method for making an optical waveguide device comprising the steps of:

providing a substrate;

depositing a layer of soot on said substrate by reacting a mixture comprising $SiCl_4$, oxygen and perchloryl fluoride ($ClFO_3$) at a temperature in the range 1000–1900° for producing silica soot;

exposing the layer of soot to a desired dopant; and sintering the doped soot layer to produce a layer of doped glass.

2. The method of claim 1 wherein said layer of soot is exposed by solution doping.

3. The method of claim 1 wherein said layer of soot is exposed to a gas containing a dopant as the soot layer is being sintered.

4. The method of claim 3 wherein said layer of soot is exposed to a gas containing fluorine or phosphorous species.

5. The method of claim 1 wherein said substrate comprises a hollow glass tube.

6. The method of claim 1 wherein said soot layer is doped with a metal.

7. The method of claim 1 wherein said soot layer is doped with a rare earth metal.

8. The method of claim 1 wherein said soot layer is solution doped with a dopant comprising erbium, ytterbium, praesodymium or neodymium.

9. The method of claim 1 wherein said soot layer is solution doped with aluminum or cobalt.

* * * * *